United States Patent [19]
Burch, Jr.

[11] Patent Number: 6,042,075
[45] Date of Patent: Mar. 28, 2000

[54] COMPUTER COPY HOLDER FOR KEYBOARD DRAWER

[76] Inventor: Warren E. Burch, Jr., 1400 Deer Ledge Trail, Cedar Park, Tex. 78613

[21] Appl. No.: 09/189,588

[22] Filed: Nov. 10, 1998

[51] Int. Cl.[7] .............................. B41J 11/02; A47B 97/04
[52] U.S. Cl. ........................ 248/442.2; 248/918; 248/460
[58] Field of Search ................................. 248/442.2, 460, 248/441.1, 918, 118, 118.1

[56] References Cited

U.S. PATENT DOCUMENTS

| | | | |
|---|---|---|---|
| D. 314,565 | 2/1991 | Davis et al. | D14/114 |
| 4,313,112 | 1/1982 | Foster | 340/700 |
| 4,893,775 | 1/1990 | Long | 248/442.2 |
| 5,104,086 | 4/1992 | Ramey, III et al. | 248/44.2 |
| 5,341,929 | 8/1994 | Stefancin, Jr. | 206/320 |
| 5,651,524 | 7/1997 | Calfee | 248/442.2 |
| 5,826,840 | 10/1998 | Yun | 248/118 |

*Primary Examiner*—Anita M. King
*Assistant Examiner*—David Heisey

[57] ABSTRACT

A computer copy holder adapted for use with a keyboard drawer at a computer work station which fits inside of keyboard drawer together with keyboard in front of computer monitor. The copy holder supports a document in a position between the keyboard and a computer monitor without obstruction by keyboard cabinet, computer, and monitor riser. When computer is not in use, copy holder is adapted to fit inside of keyboard drawer with keyboard which is positioned inside of keyboard cabinet. The copy holder serves as an inline document holder and also serves as additional workspace by holding reference materials when keyboard drawer containing keyboard is extended from keyboard cabinet for use at a computer work station. The apparatus includes a base plate upon which a keyboard is placed and which further forms an inclined support ridge above the keyboard against which a copy support plate rests. It further includes an inclined copy rest for support of a copy support plate and copy material above the keyboard.

12 Claims, 4 Drawing Sheets

COMPUTER COPY HOLDER FOR KEYBOARD DRAWER

BACKGROUND OF THE INVENTION

1. Field of the Invention

The present invention generally relates to copy holders for computer work stations, and more particularly to a document holder which is adapted for use with a keyboard drawer and keyboard cabinet.

2. Description of the Prior Art

It is desirable to hold a document or a book in position between a keyboard and a monitor so that a person working at a computer work station can more easily transcribe or edit materials on the computer without having to turn to one side to look at a document. It is also desirable to provide a copy holder which holds copy in direct line of sight in front of and close to the user and which is also adapted to fit inside of a keyboard drawer during use. It is also desirable to easily remove a copy holder from a work surface when a computer is not in use in order to make efficient use of a work surface by means of a copy holder which is adapted to fit inside of a keyboard drawer together with the keyboard where the drawer is extendible from and fits inside of a keyboard cabinet.

Keyboard drawers which can be extended from a cabinet which is positioned underneath a computer monitor are typically used when there is need for additional room for placement of a keyboard between a monitor and the edge of a work surface or there is need for more work surface when a computer is not in use. The general limitation to providing a document holder which is in direct line of sight with the monitor screen is also a lack of depth of a traditional work surface. There is usually not room between a computer and a keyboard or between a monitor and a keyboard to provide an inline document holder.

A keyboard drawer provides a means for support of a keyboard beyond the edge of a work surface and also provides a convenient method of removing and storage of the keyboard in order to free the work surface for other use. A need exists for a copy holder adapted for use with a keyboard drawer and keyboard cabinet and which fits inside of a keyboard drawer and inside of a keyboard cabinet with the keyboard in order to make even more efficient use of a work surface. Such a copy holder not only does not infringe on the limited space of a traditional work surface but also increases working space by providing additional space for placement of one or more documents. It has the ability to extend beyond the edge of a work surface when the keyboard drawer is extended since it is positioned inside of the keyboard drawer. Room is thereby provided for a document holder which is also in the ergonomically correct direct line of sight of the user.

By closing the keyboard drawer when the computer is not in use, with the copy holder positioned inside, valuable space of a desk work surface is not encumbered with the copy holder nor is it encumbered with the keyboard. By providing a copy support plate that is removable from the remainder of the copy holder, the copy support plate is placed inside of the keyboard drawer and on top of the copy holder above the keyboard for storage inside of the keyboard drawer when not in use.

Many prior art copy holders must be placed to one side of the computer rather than between the computer keyboard and the display. This placement forces the computer operator to constantly look to the left or right to view the copy, often causing neck and back strain, as well as resulting in inefficient work. The placement to one side makes it more difficult to see print because it is placed at a greater distance from the viewer. Placement of a copy holder to one side of the computer also uses or blocks valuable desk top space and must frequently compete for space with a computer mouse and mouse pad, a fax machine, printer, compact disc holders and other equipment. The common usage of computer peripheral devices have crowded the effective work surface and have limited the room for a copy holder. Other disadvantages of prior art copy holders include difficulty in accessing computer disk drives, and the relatively small surfaces for holding documents.

Prior art copy holders frequently have many parts which must be manufactured and assembled, increasing the manufacturing costs. The prior art includes several attempts to create inline document holders as well as a number of copy holders which are designed to be held at the side of the monitor.

U.S. Pat. No. 3,954,314 to Crawford, issued on May 4, 1976, describes a paint box and easel combination. A detachable lid for a base functions as a palette. An upright member having a bail fits into rib notches through the base center to adjust the angle of the easel upright relative to the tray. An easel extension slides in an upright socket and is fixed in extension for painting. The present invention is an inline copy holder adapted for use with a keyboard drawer and keyboard cabinet. The present invention has no upright socket nor does it have an easel extension. An object of the present invention is limitation of the number of parts and ease of manufacture resulting in a durable yet economic means for holding copy material in a comfortable and ergonomic position, adapted for a keyboard drawer and keyboard cabinet.

U.S. Pat. No. 4,588,074 to Strong et al, issued on May 13, 1986 describes a holder for storing books and for supporting articles in open position and includes a body and a cover hinged together. The cover is pivotable fowardly and downwardly about a pair of double-acting hinges. The present invention includes a detachable copy support plate that is advantageously supported above a keyboard when in use, effectively avoiding obstruction by a keyboard cabinet and desk top computer when positioned inside of a keyboard drawer and when the copy support plate tilts backwards in order to support a document. The copy support plate is stored within a keyboard cabinet with the keyboard and keyboard drawer when a computer is not in use. The present invention does not have hinges. It is an object of the present invention to have a minimal number of parts so that economical manufacture is achieved.

U.S. Pat. No. 4,162,055 to Summers, issued on Jul. 24, 1979, describes a copyholding device having a pivotally mounted support column and a support platform telescopically connected. It further includes a base assembly of a multiple layer construction and a projecting flange portion with a pivot pin. The support column has a vertically spaced upper and lower end section and a generally horizontally extending section disposed between and interconnecting the end sections. The present invention does not have a support column and does not have a pivot pin. It is an object of the present invention to minimize the number of parts in order to achieve economic manufacture. The present invention can be economically manufactured by extrusion or injection molding and utilization of a polymeric material. It is an object of the present invention to provide an easily removable copy support plate for easy access to a computer disk drive and for easy storage inside of a keyboard drawer within a keyboard cabinet together with a keyboard. It is an object of the present invention to provide a sturdy document holder to be used in conjunction with a monitor and computer keyboard drawer.

U.S. Pat. No. 4,184,725 to Spangler, issued on Jan. 22, 1980, describes a book-holding apparatus to be used with a kitchen cabinet and the like. It includes a leaf to be used as a book-holder. The leaf is enclosed in a box frame having two spaced sides and a back. The leaf is supported within the frame by a slot. The present invention has no box frame nor slots and is adapted for use with a keyboard drawer and keyboard cabinet. The present invention includes a copy support plate which is supported above a keyboard and is tilted backwards without obstruction by the keyboard cabinet computer, monitor riser, and monitor, when positioned inside of a keyboard drawer.

U.S. Pat. No. 4,546,947 to Gesten, issued on Oct. 15, 1985, describes a cover and copy holder for a keyboard housing which includes a planar cover body attached by a pivot pin, and a mounting means including a clasp. When the cover is lifted, paper which is supported by a receptacle on the underside, is in plain view. The present invention includes a removable copy support plate which is interchangeable. The present invention includes a top support which importantly extends over the rear portion of a keyboard without obstructing use of keyboard keys. The bottom edge of the copy support plate is directly above the keyboard. The copy support plate tilts backward without obstruction by the front edge of a keyboard cabinet, and computer, making the inline copy holder operative within the very limited confines of a keyboard drawer extended from a keyboard cabinet. This unique feature is a distinct advantage to be appreciated by those skilled in the art. The present invention has no side walls and is economic to manufacture. The present invention further includes a copy support plate which is easily removed and stored with the remainder of the copy holder inside of a keyboard cabinet with a keyboard. The present invention maximizes efficient use of desk top space and does not mitigate the aesthetics of an office environment. The present invention has less parts. It has no pivot pin, no clasp, no hinge means, and may be manufactured efficiently by either extrusion or injection molding. It is an object of the present invention to provide a sturdy copy holder device of the above character that is of a relatively simple and straightforward design and therefore, may be economically manufactured and will have a long and effective operational life.

U.S. Pat. No. 4,893,775 to Long describes an inline copy holder stand equipped with a forwardly inclinable copy holder back which allows access to the computer disk drives. A brace maintains the copy holder back in a generally upright position in which the back is used to hold the copy material. A disadvantage of this design is the requirement to pivot the entire copy holder back forward over the documents in order to access the disk drive of the computer. A preferable method of access for the disk drive is to have the option to merely pick up the material and copy support plate or tilt the copy support plate forward. Since the copy support plate fits inside of the keyboard drawer for storage, the computer and monitor can also be accessed while the copy support plate is inside of the keyboard drawer. These simple methods of access is possible with the current invention because the copy support plate is removable and rests against the support ridge and on top of the copy rest when in use. The mechanism of the '775 patent is more complicated than the present invention.

U.S. Pat. No. 5,452,876 to Hatcher, issued on Sep. 26, 1995, describes a copy holder for use inline with a monitor stand which comprises a pull-out copy holder and an incline of about 22 degrees with respect to the table top surface. An object of the present invention is to provide a simpler copy holder which rests inside of a keyboard drawer when in use and remains in and is stored in the keyboard drawer when not in use. An object of the present invention is to provide a greater angle for holding the copy for more effective viewing by the user and which is ergonomically correct. It is a further object of the current invention to provide a simple mechanical apparatus providing that copy holding function which does not involving bolting any fixture to a desk or work surface. The current invention permits the use of interchangeable copy support plates of varying sizes, including the use of a copy support plate which can support at least two 8½" by 11" pages to accommodate the needs of a user who may have a large work project requiring placement of more than one page in line of view for reference at the same time.

U.S. Pat. No. 5,104,086 issued to Ramey et al on Apr. 14, 1992, describes a generally planar base plate with an upstanding easel which has a projecting lip. The easel is vertically adjustable and transversely slidable to permit access to the computer disk drive. In addition to its simplicity, an advantage to the present invention involves the ability to be conveniently stored completely inside of a keyboard drawer with the keyboard which when not in use. The copy holder cannot be seen and does not occupy desk top space when it is inside of the keyboard drawer inside of a keyboard cabinet for storage.

U.S. Pat. No. 5,341,929 issued to Stefancin on Aug. 30, 1994, describes an adjustable keyboard tray assembly and copy stand which can be folded over the keyboard to a flattened arrangement to facilitate storage. The keyboard tray assembly includes a clasp to retain and support computer keyboards in an adjustable downward angle and a support leg. The copy stand also includes a connector arm. The present invention includes a removable copy support plate and does not include a connector arm. The present invention is a simpler and economical device that effectively functions as an inline copy holder within a keyboard drawer.

U.S. Pat. No. 5,690,216 issued to Liu on Nov. 25. 1997, describes a pencil box with a copy holder structure. It includes a box cover hinged to the box body, two stands, a bottom rack, a top rack and two support arms. The present invention does not have support arms and does not have hinges. An object of the present invention is to provide an ergonomic inline copy holder adapted for use with a keyboard while the keyboard rests on a keyboard drawer which is extended from a keyboard cabinet for use at a computer work station.

U.S. Pat. No. 5,786,861 issued to Parker on Jul. 28, 1998, describes a detachable clipboard structure for attachment to a computer keyboard comprising two arm bases adapted to be attached to the sides of the computer keyboard. It is an object of the present invention to include a detachable copy support plate which is positioned on top of a copy rest whereby a keyboard is positioned underneath the copy support plate thereby permitting use within the limited space of a keyboard drawer. It is an object of the present invention to provide a detachable copy support plate that tilts backwards against a support ridge and is not obstructed by a keyboard cabinet, computer, monitor riser, and monitor, when it is positioned inside of a keyboard drawer which is extended from a keyboard cabinet.

In addition to the attempt for design of inline copy holders, there have been a number of designs involving the placement of the copy to the side of the computer monitor.

U.S. Pat. No. 5,732,924, issued on Mar. 31, 1998, to Hegarty and Terc describes a counter balanced copy holder which is typically attached to a monitor. That copy holder includes a support arm for orienting the copy holder in space to either the right or left of the computer monitor. The present invention is simpler and requires no support arms.

U.S. Pat. No. 5,651,524 issued on Jul. 29, 1997, to Calfee for an adjustable document holder for a computer work station describes a document holder which may be positioned along three mutually perpendicular axes and which may be rotated about one of the axis to place the easel in a selective working position. The present invention provides a means for efficient ergonomic placement of copy directly in front of and close to the user, in direct line of sight with a monitor screen without complex mechanisms and at low cost.

A problem with prior art computer copy holders is that the copy holders are designed for only a few specific types of computers. Thus, prior art work stations were not always designed to permit disk entry access from different locations, nor to retain various types and sizes of disk drive units, monitors and keyboard placements.

Those who use computer keyboard drawers which extend from computer cabinets which are placed underneath the monitor usually have very limited space between the front edge of their desk and the computer monitor. That is a primary reason for making the expenditure and adopting the use of a keyboard drawer which can extend beyond the front edge of a desk and further, be stored inside of the cabinet when not in use, freeing the work surface for other use. It is an object of the current invention to provide a document holder which adapts fully and advantageously to the severe spatial limitations presented by a keyboard drawer and keyboard cabinet.

It is an object of the current invention to provide an inexpensive document holder to hold documents in a convenient inline manner between the user, the computer keyboard and the computer monitor.

It is a further object of the current invention to provide a document holder which will hold single sheets or opened tablets in place without the need for clips, springs or other devices to hold a document.

It is a further object of the current invention to reduce the number of mechanisms, avoid the use of an arm device and hinges and to provide a removable and interchangeable copy support plate for ease of use.

It is a further object of the current invention to provide a simple device that increases efficient use of effective work surface by having room for an inline document holder on virtually any size desk or table.

It is further object of the current invention to provide a simple copy holder in a manner that increases the effective work surface by having the capacity to store the copy holder with a keyboard inside of a keyboard drawer and inside of a keyboard cabinet that holds the keyboard drawer when the computer is not in use.

It is further object of the current invention to provide a simple combination device that is not attached by bolts, screws, pivot pins or other fasteners to anything, thereby allowing easy removal for storage when not in use.

It is a further object of the current invention to provide a document holder that can hold more than one page simultaneously.

It is further object of the current invention to provide a simple mechanical device that will work well with tower style or desktop style computers so as to be capable of utilization with substantially all computer hardware.

It is further object of the current invention to provide a simple relatively inexpensive document holding capability without requirement for moving parts or a large number of parts.

A further object of the current invention is to provide a computer work station which permits access to the disk drive while maintaining the copy holder stand in an upright position.

Yet another object of the present invention is to provide a computer workstation which is economical to manufacture, refined in appearance, and simple to utilize but nevertheless maximizes function. These and other objects will be apparent to those skilled in the art.

The terms copy holder and easel are generic descriptions of support means, and it is obvious to those skilled in the art that many types of supports may be employed in the invention. Terms such as front, rear, top, bottom, left, and right are used to communicate the nature of the invention and not to restrict its application.

SUMMARY OF THE INVENTION

The preferred embodiment copy holder of the present invention includes a generally planar base plate with a vertical rear support member, a top support forwardly inclined and integral to the rear support, and a forwardly inclined copy rest integral to the front edge of the top support. It further includes an upstanding support ridge integral to the top surface of the copy rest at the rear of the copy rest. An upstanding rear inclined easel further described as a copy support plate rests against the upstanding support ridge and on top of the top support. The bottom edge of the easel is prevented from sliding forward by being positioned in a groove located across the top surface of the copy rest in front of the support ridge and generally horizontal to the support ridge. Alternatively, an upstanding projection means located in front of the bottom edge of the copy support plate in lieu of the groove prevents the bottom edge of the copy support from moving forward. The upstanding easel has its lower rear surface supported against the front surface of the support ridge. The upstanding rear inclined easel supports a document in direct line of view with a monitor without the need for a clip or other securing means.

The copy holder is adapted to and fits inside of a keyboard drawer and the like which is extended from a keyboard cabinet at a computer work station. In the preferred embodiment, the keyboard rests on top of the base plate, providing additional stability to the copy holder. The top support member extends forwardly above the base plate so that the rear portion of a keyboard resting on top of the base plate can be placed underneath the support ridge and copy rest. An uptanding easel is supported above the rear portion of the keyboard, thereby providing room for the upstanding easel which has a rear incline without obstruction by the top front edge of a keyboard cabinet, a computer, or monitor riser which is positioned on top of the keyboard cabinet at a computer work station. When not in use, the easel is placed in a substantially horizontal position on top of the front inclined support member and on top of the rear inclined support member for storage in the keyboard drawer inside of the keyboard cabinet.

BRIEF DESCRIPTION OF THE DRAWINGS

These and other objects and advantages of the present invention are set forth below and further made clear by reference to the drawings, wherein.

DETAILED DESCRIPTION OF THE PREFERRED EMBODIMENTS

Figure 1:
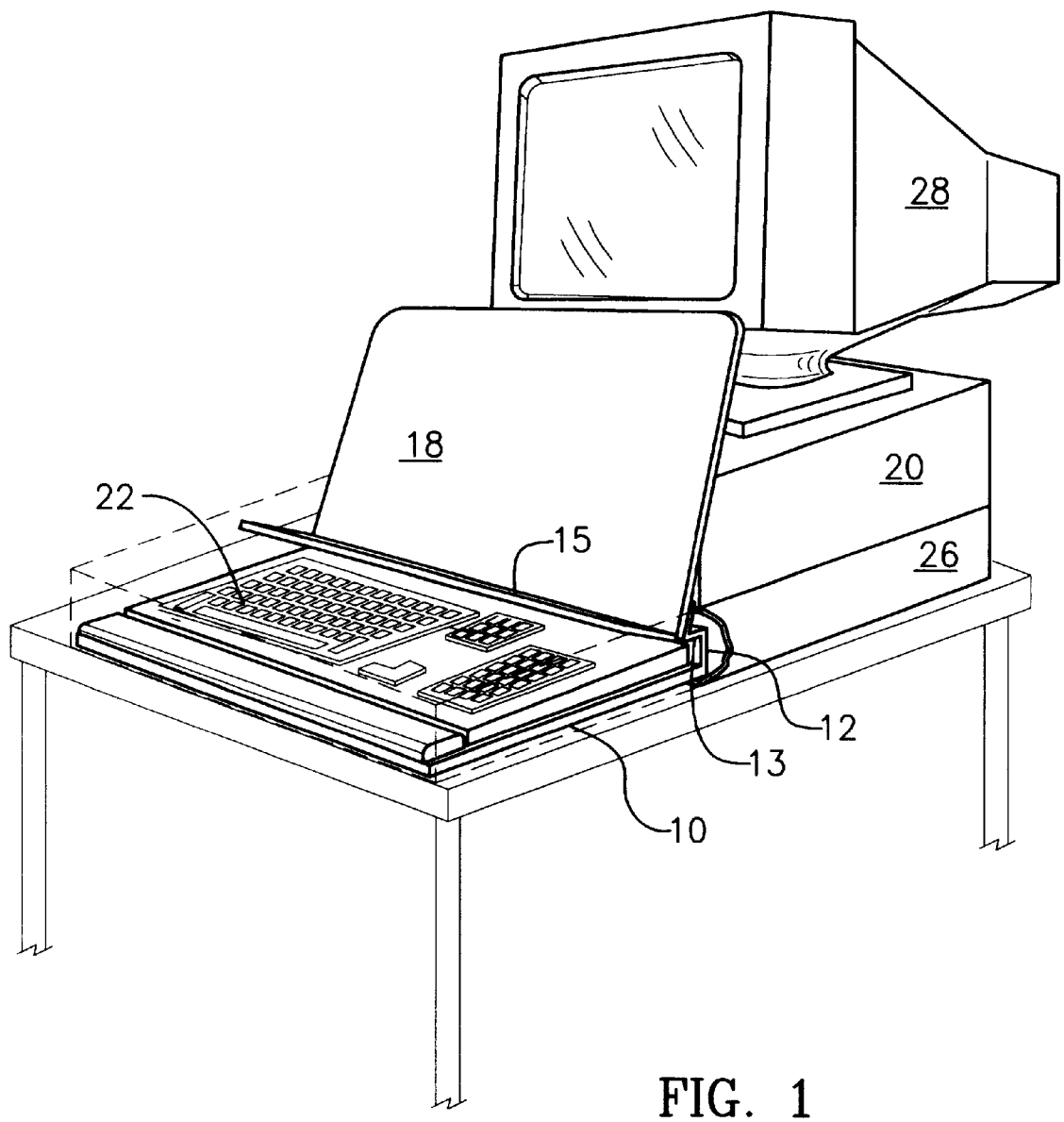
FIG. 1 is a perspective view of the preferred embodiment showing a keyboard resting on top of a base plate inside of a keyboard drawer which is extended form a keyboard cabinet, a copy support plate on top of a rear support and positioned against a support ridge, a copy rest, and a monitor resting on top of a computer.

Referring now to FIG. 1, which is a side view of the preferred embodiment, a generally rectangular and planar base plate 10 rests upon a work surface 30 such as a desk or computer table.

In the preferred embodiment, the copy holder is positioned inside of a keyboard drawer 24 with a removable copy support plate 18 which extends generally upright with a rear incline from inside of the keyboard drawer. The bottom edge of copy support plate 18 is above the rear portion of a keyboard 22 and sufficiently to the front of keyboard cabinet 26 to permit a rear incline of copy support plate 18 when keyboard drawer is extended for use. This is an important feature because a keyboard cabinet 26 is designed to have a monitor 28 positioned above the cabinet with a keyboard drawer 24 attached to and extending directly from the cabinet, not providing sufficient space for a copy holder positioned between the front edge of keyboard cabinet 26 and keyboard 22 which is positioned inside of keyboard drawer 24. The copy holder is thereby positioned between keyboard 22 and monitor 28 without obstruction of copy support plate 18 by the front edge of keyboard cabinet 26. The rear portion of the present invention actually extends inside of the front of keyboard cabinet 26, effectively adapting to the limitation of space provided by keyboard drawer 22. Since copy support plate 18 has a rear incline, it supports a document without the necessity of a clip or other means of securing a document in a generally upright position. The rear incline of copy support plate 18 also reduces the height of its top edge in order to further avoid obstruction of the screen of monitor 28 when monitor 28 is positioned on top of a computer 20 or on top of a monitor riser.

Computer 20 is positioned on top of keyboard cabinet 26. Monitor 28 is placed on top of computer, raising the monitor screen to a height sufficient to avoid obstruction of view by rear inclined copy support plate 18.

Figure 2:
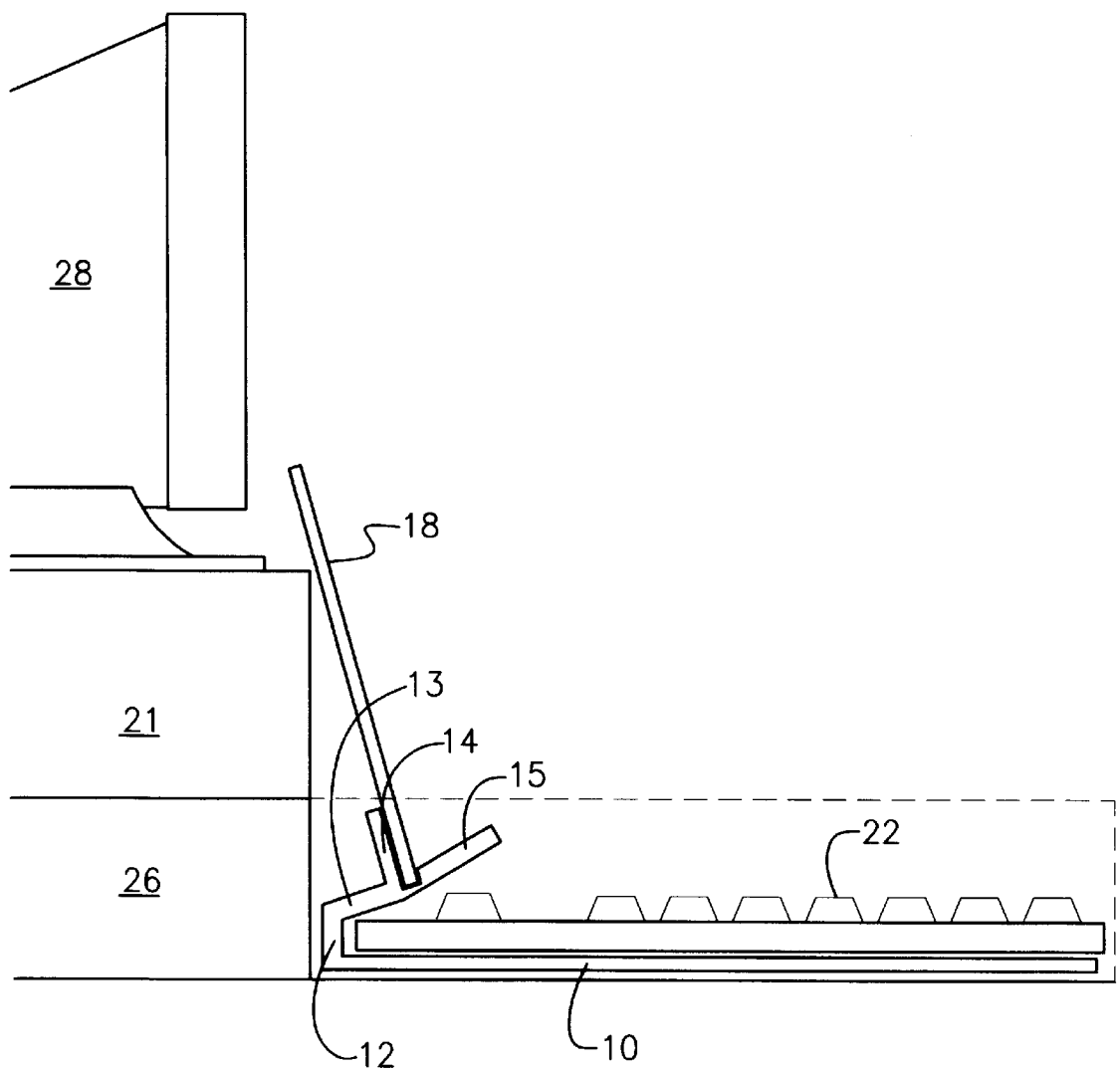
FIG. 2 is a side view of the preferred embodiment positioned inside of a keyboard drawer which is extended from a keyboard cabinet showing a monitor riser on top of the keyboard drawer and a monitor on top of the monitor riser.

Referring now to FIG. 2, if the present invention is used in conjunction with a tower type computer or if computer 20 as shown in FIG. 1 does not have sufficient height, then a monitor riser 21 is used to raise the monitor screen to a height sufficient to avoid obstruction of view by copy support plate 18. The monitor riser is placed on top of keyboard cabinet 26 and underneath monitor 28 or on top of computer 20 and underneath monitor 28.

Keyboard drawer 24 and keyboard cabinet 26 are used by one who especially desires additional work surface since he or she uses a keyboard drawer as a means for removing keyboard 22 from a work surface 30 when keyboard 22 is not in use. Keyboard drawer 24 slides into keyboard cabinet 26 when keyboard 22 is not in use.

The present invention enables user to place copy materials directly in line between keyboard 22 and a monitor 28 when using keyboard cabinet 26 and keyboard drawer 24 in order to save space. Placing copy materials in line of sight directly below a monitor screen and without obstruction of such screen results in ease of viewing of copy material and greatly enhances worker comfort. The present invention reduces fatigue and eye strain. Copy is placed in front of and close to the user, a significant advantage for those who do not have perfect vision. A user need not croon his neck nor bend his head in order to see copy and reference materials. The present invention also increases work station space by providing a resting place for copy and reference materials in lieu of the desk top surface when using a computer.

Figure 3:
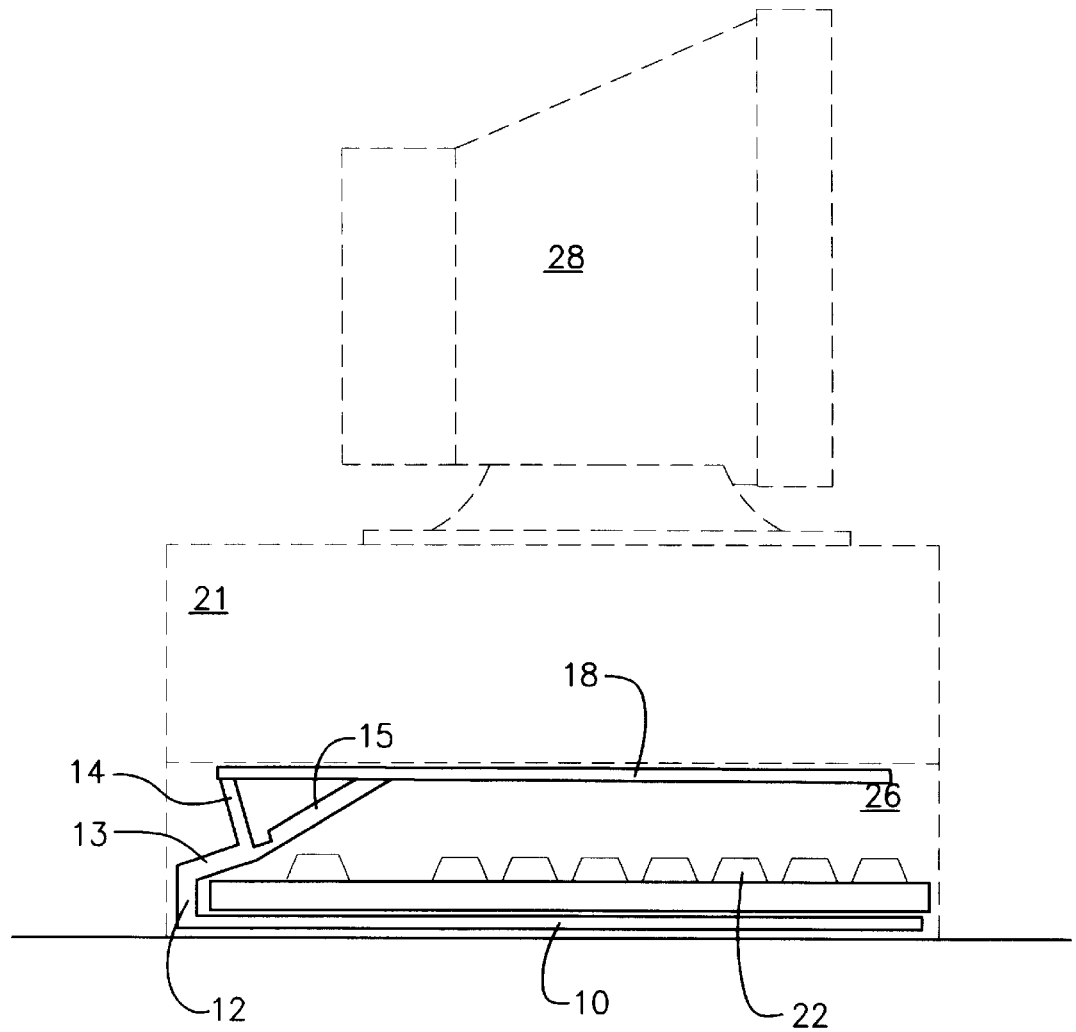
FIG. 3 is a perspective view of the rear of the preferred embodiment showing openings in the bottom support through which cable from keyboard can extend to computer.

Referring now to FIG. 3, when computer 20 is not in use, copy support plate 18 is placed in a generally horizontal position on top of the top edges of support ridge 14 and copy rest 15 above keyboard 22 for storage with the keyboard inside of keyboard cabinet 26. The inline copy holder uses no desk top space when the computer is not in use. This unique feature is a significant advantage by maximizing available work space at a computer work station.

Referring now to FIG. 2, the present invention includes a generally rectangular and planar base plate 10 which rests on the top surface of the bottom of keyboard drawer 24. Keyboard 22 rests on top of the top surface of base plate 10. Base plate 10 has a preferred length of approximately 18 inches, a preferred width of approximately 6 to 7 inches and a preferred thickness of approximately ⅛ inch.

The preferred length of base plate 10 is approximately the length of a standard keyboard which is placed on the top of the base plate. The preferred length of base plate 10 also enables it to conveniently fit inside of keyboard drawer 24 together with keyboard 22. This is a distinct advantage because the present invention does not require nor use desk top space. It is advantageously positioned away from a monitor and inside of keyboard drawer 24, when keyboard drawer 24 is opened for use. This provides room for a copy support plate 18 to have a rear incline away from the user and toward a monitor without obstruction by the front edge of the top surface of a keyboard cabinet. The rear incline of copy support plate 18 is important because the front surface of copy support plate 18 forms a stable support for documents and reference materials without such materials falling forward.

The preferred width of base plate 10 prevents the copy holder from tilting forward when supporting copy support plate 18 and documents. By providing positioning of keyboard 22 on top of base plate 10, the present invention is further stabilized by the weight of keyboard 22.

A generally rectangular and planar rear support 12 is generally vertical to base plate 10 and integral to base plate 10 at the rear edge of base plate 10. Rear support 12 has a preferred length of approximately 18 inches and a preferred width of approximately 1 to 2 inches and a preferred thickness of approximately ⅛ inch and extends substantially across the length of base plate 10.

Figure 4:
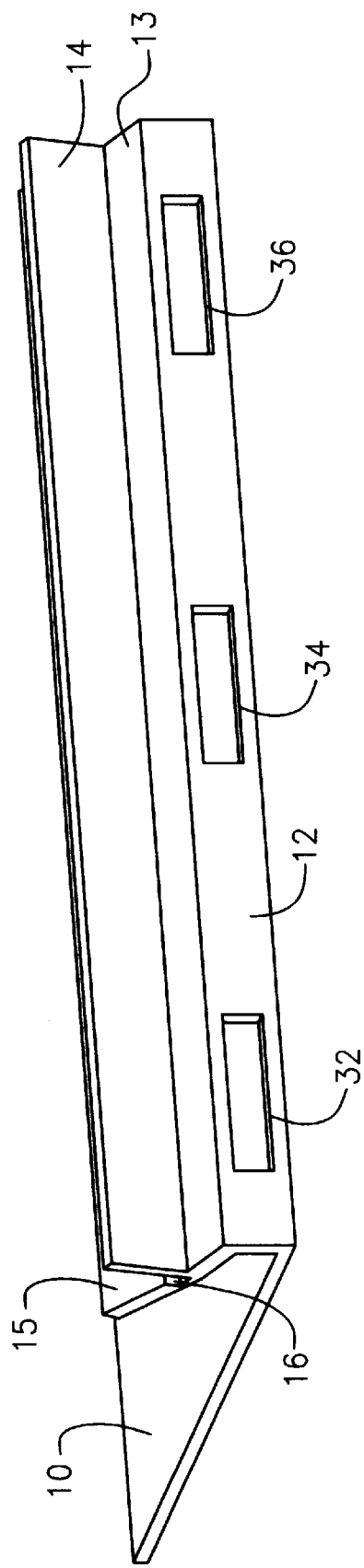
FIG. 4 is a side view showing the preferred embodiment stored with a keyboard inside of a keyboard drawer which is inside of a keyboard cabinet.

Referring now to FIG. 4, rear support 12 has generally rectangular openings 32, 36 beginning approximately 2½ inches from each side edge and approximately ⅜ inch from the bottom edge and approximately ⅜ inch from the top edge and which extend approximately 2½ inches toward the center. Rear support 12 also has a generally rectangular opening 34 located approximately ⅜ inch from the top edge, approximately ⅜ inch form the bottom edge, approximately 6¾ inches from the right edge and approximately 6¾ inches from the left edge. Each opening has a length of approximately 2½ inches and a width of approximately ¾ inch. Cable from keyboard 22 extends from the keyboard through any of the openings to the computer. Openings 32,34,36 provide a means for which keyboard 22 can be operationally positioned directly against the front surface of rear support 12. The preferred width of rear support 12 is important because the width of rear support 12 increases the height of a top support 13 so that the rear portion of a keyboard has room underneath top support 13 and a copy rest 15.

The generally rectangular and planar top support 13 has a forward incline in the direction of the front of the keyboard of approximately 0 to 20 degrees and is integral to the top of rear support 12. Top support 13 has a preferred length of approximately 18 inches and a preferred width of approximately 1 inch and a preferred thickness of approximately ⅛ to ⅜ inch. The forward incline of top support 13 combined with the width of rear support 12 provides room for the rear portion of a keyboard to be positioned on top of base plate 10 and underneath top support 13. This is an important feature because a space generally exists between the rear side of the rear keys of a keyboard and the rear edge of the keyboard. By positioning the keyboard on top of base plate 10 so that the rear side of the keyboard is near rear support 12, the rear keys are not obstructed by top support 13 nor by copy rest 15. The present copy holder does not obstruct access to any keyboard keys with the fingers nor does it obstruct the view of any keyboard keys while extending over the keyboard. The present invention has the unique feature of having room for its positioning inside of a keyboard drawer together With a keyboard in direct line of sight with a computer monitor without causing obstruction of the keyboard keys even though a keyboard drawer has very limited space. Prior art shows copy holders which are positioned outside of keyboard drawers.

Referring now to FIG. 2, a copy support plate 18 rests upon a support ridge 14 which is integral to the top surface of top support 13 and at the front of top support 13. Since a support ridge 14 upon which a copy support plate 18 rests, is integral to the top surface at the front of top support 13, room is provided so that copy support plate 18 has a rear incline in order to support copy materials without the front edge of the top surface of keyboard cabinet 26 causing obstruction of copy support plate 18. Because of this unique feature, the present invention effectively supports copy despite the frequently small confines of a keyboard drawer and keyboard cabinet.

A support ridge 14 is generally rectangular and planar, has a rear incline of approximately 50 to 75 degrees. The bottom edge of support ridge 14 is integral to the top surface of top support 13 at the front of top support 13. Support ridge 14 has a preferred length of approximately 18 inches and a preferred width of approximately ¼ to ½ inch and a preferred thickness of approximately ⅛ inch. Support ridge 14 extends substantially across the length of top support 13 and is integral to the top surface and front edge of top support 13. Support ridge 14 has a rear incline of approximately 50 to 75 degrees. The width and incline of support ridge 14 is important because the top edge of support ridge has a height that allows for closing of a keyboard drawer while inside of the drawer Without obstruction by the top front edge and interior surface of the top of the keyboard drawer. This unique feature permits storage of the copy holder inside of the keyboard drawer and inside of the keyboard cabinet when the computer is not in use.

As further shown in FIG. 2, a generally rectangular and planar copy rest 15 is integral to the front edge of top support 13. Copy rest 15 has a length of approximately 18 inches, a width of approximately ⅝ to 1 inch and a thickness of approximately ⅛ to ⅜ inch. Copy rest 15, which is integral to the front edge of top support 13, extends across substantially the length of such front edge. Copy rest 15 has a forward incline of approximately 30 to 65 degrees. Copy rest 15 provides support for copy which is placed on its top surface. The forward incline of copy rest 15 is important because it enables view of and access to keyboard keys of a keyboard positioned beneath the copy rest. The width and incline of copy rest 15 is also important because the top edge of the copy rest has a height that allows the closing of a keyboard drawer while inside of the drawer and without obstruction by the top front edge and interior surface of the top of the keyboard cabinet. This unique feature permits storage of the copy holder inside of the keyboard drawer and inside of the keyboard cabinet when the computer is not in use.

The rear of the top surface of copy rest 15 upon which copy support plate 18 rests has a height which is less than the top surface of keyboard cabinet 26. This has the unique feature of providing positioning of the bottom edge of copy support plate 18 below the top surface of keyboard cabinet 26. Since monitor 28 is placed on top of computer 20 which is placed on top of keyboard cabinet 26 or on top of a monitor riser which is placed on top of keyboard cabinet 26, this lower positioning of copy support plate 18 advantageously helps prevent obstruction of the monitor screen.

The preferred embodiment has a groove 16 shows in FIG. 2 which extends substantially across the rear of the top surface of copy rest 15 in front of the support ridge and substantially parallel to support ridge 14. Groove 16 has a length of approximately 18 inches, a width of approximately ⅛ to ⁵⁄₁₆ inch and a depth of approximately ⅛ to ⅜ inch. The bottom edge of a copy support plate 18 is placed inside of groove 16. The bottom edge of copy support plate 18 is positioned inside of groove 16. Groove 16 prevents copy support plate from tilting completely backwards by preventing the bottom edge of copy support plate 18 from moving forward. Although a groove satisfactorily prevents copy support plate 18 from tilting completely backwards, it is to be understood by those skilled in the art that a projection in the form of an upstanding tab or in the form of one or more upstanding spikes extending from the top surface of copy rest 15 can also perform the function of preventing the bottom edge of copy support plate 18 from moving forward and thereby preventing copy support plate 18 from tilting completely backwards when the bottom edge of copy support plate 18 is positioned on top of copy rest 15 and between support ridge 14 and the upstanding tab or upstanding spike.

The base plate, bottom support, top support, support ridge, and copy rest are preferably composed of ⅛ to ¼ inch ABS plastic, hair cell finish, light gray, and preferably manufactured by means of extrusion as one piece. It can also be made by means of injection molding. Other polymeric material which combines strength and rigidity with ease of manufacture may be used.

Copy support plate 18 is generally rectangular and planar and has a length of approximately 16 to 20 inches, a width of approximately 9 to 11 inches and a thickness of approximately ⅛ to ¼ inch. By placing the bottom edge of copy support plate 18 inside of groove 16 and by placing the rear surface of copy support plate 18 against the front surface of support ridge 14, copy support plate 18 is supported in a generally upright position with a rear incline of approximately 50 to 75 degrees. The front edge of groove 16 prevents copy support plate 18 from tilting completely backwards when the copy support plate rests against support ridge 14. It is understood that other means of preventing copy support plate 18 from tilting backwards is possible such as projection in the form of an upstanding ridge parallel to the copy support plate or one or more upstanding spikes located on copy rest 15 approximately ⅛ to ¼ inch in front of support ridge 14. The feature of providing a front edge that prevents the bottom edge of copy support plate 18 from sliding forward effectively stabilizes copy support plate 18.

Since copy support plate 18 is removable, a computer disk drive is easily accessed when the copy holder is in use by either tilting copy support plate 18 forward or by removing it from copy rest 15. Since copy support plate 18 is generally stored inside of keyboard drawer 24 when the copy holder is not in use, a computer disk drive is not obstructed.

A document is supported by placing it on the top surface of copy rest 15 and on top of the front surface of copy support plate 18. This is a distinct advantage because a document is then positioned in direct line of sight, close to and in front of the user, between a keyboard and a monitor even when user has elected to use a keyboard drawer and keyboard cabinet in order to save desk top space.

Although many materials such as fiberboard and wood will provide a planar surface sufficient to provide a copy support plate, the preferred material for construction of copy support plate 18 is ⅛ inch thick expanded foam PVC, light gray and cut with slightly rounded corners. Copy support plate 18 could also be manufactured by means of injection molding and utilization of other recycled polymeric materials.

To use the invention as a copy holder with a desk top type computer, the computer operator places the keyboard cabinet on top of the work surface. The desk top computer is placed on top of the keyboard cabinet and the monitor is placed on top of the desk top computer. The monitor screen then has sufficient height so that the copy support plate positioned on top of the copy rest does not obstruct the view of the monitor screen. If the monitor screen does not have sufficient height, a monitor riser is placed on top of the top surface of the desk top computer and the monitor is placed on top of the monitor riser. A monitor riser is used to raise a monitor to sufficient height when using the present invention in conjunction with a tower type computer that is not positioned underneath the monitor. The monitor riser usually remains in position permanently, easily enabling view of the monitor screen without obstruction by the copy support plate and copy which is placed on top of the copy support plate.

The computer operator places the base plate, together with the bottom support, top support, support ridge and copy rest as one unit in the bottom of an open keyboard drawer which typically slides out of a keyboard cabinet. The bottom support, top support, support ridge and copy rest are placed to the rear of the keyboard drawer with the base plate resting on the bottom of the drawer. A keyboard is placed on top of the base plate with the rear portion of the keyboard positioned underneath the top support and copy rest. The bottom edge of the copy support plate is placed on the top surface of the copy rest and inside of the groove. The copy support plate is then tilted away from the user so that its rear surface rests against the front surface of the support ridge. The copy support plate is then in a generally upright position tilting away from the front of the keyboard drawer. The bottom edge of copy is placed on the top surface of the copy rest. The rear surface of the copy rests against the front surface of the copy support plate.

In order to access a front disc drive and to operate the computer when using the copy holder in conjunction with a desk top type computer, a user either tilts the copy support plate forward or temporarily removes it by lifting it from the copy rest.

When the computer operator is no longer using his computer, he removes the copy support plate from the copy rest and places it lying in a generally horizontal position on top of the top edge of the support ridge and on top of the top edge of the copy rest inside of the keyboard drawer. The bottom planar surface of the copy support plate lying in a generally horizontal position is supported by the top edge of the support ridge and the top edge of the copy rest. The keyboard drawer is then closed by pushing inside of keyboard cabinet. The copy holder is no longer in view and is generally permanently stored within the keyboard drawer. The copy holder does not use desk top space and is stored inside of the keyboard cabinet with the keyboard. When the computer operator wishes to use his computer again, he opens the keyboard drawer and easily places the copy support plate on top of the copy rest and against the support ridge. The in line of sight copy holder is then ready for use. His copy or reference materials are placed on top of the copy rest and against the copy support plate, in a very comfortable, ergonomic and convenient location.

In view of the above, it will be seen that the objects of the invention are achieved. Although preferred embodiments of the present invention have been shown, it is obvious that many modifications and variations of the present invention are possible in light of the above teachings. It is therefore to be understood that the present invention may be practiced otherwise than as specifically described.

What is claimed is:

1. A document holder adapted for use with a keyboard, a keyboard drawer and a keyboard cabinet at a computer workstation comprising:
    a substantially planar base plate support, said substantially planar base plate support having a top surface, a bottom surface, a front edge, a rear edge, a right side edge and a left side edge, said substantially planar base plate adapted to be disposed beneath a keyboard;
    an upstanding rear support member ex-tending upwardly at the rear of said substantially planar base plate support, said upstanding rear support member adapted to be disposed behind a keyboard;
    a forward extending top support member in front of said upstanding rear support member and integral to said upstanding rear support member, said forward extending top support member adapted to be disposed above a keyboard;
    an upstanding rear inclined support member at the front of said forward extending top support member, said upstanding rear inclined support member adapted to be disposed above a keyboard;
    a forward extending support member at the front of said upstanding rear inclined support member, said forward extending support member adapted to be disposed above a keyboard;
    a removable copy support plate having a top surface, a bottom surface, and a bottom edge, wherein, in use, said bottom surface of said copy support plate rests against the front surface of the upstanding rear inclined support member, and wherein, in use, said bottom edge of said copy support plate rests against the top surface of the forward extending support member, said removable copy support plate, in use adapted to be disposed above a keyboard; said removable copy support plate adapted to be disposed inside a keyboard drawer when not in use;

a groove comprising means for preventing the bottom edge of said copy support plate from moving forward, said groove being positioned on top of the forward extending support member and substantially parallel to the front surface of the upstanding rear support member, wherein the bottom edge of said copy support plate is placed in said groove;

wherein said substantially planar base plate support, said upstanding rear support member, said forward extending top support member, said upstanding rear inclined support member, said forward extending support member, and said groove are adapted to be disposed in a keyboard drawer; and wherein said substantially planar base plate support, said upstanding rear support member, said forward extending top support member, said upstanding rear inclined support member, said forward extending support member, said removable copy support plate, and said groove are adapted to be disposed within a computer keyboard cabinet when not in use.

2. The document holder of claim 1 wherein said upstanding rear inclined support member and said forward extending support member are integral to each other, and wherein said upstanding rear inclined support member and said forward extending support member are integral to said substantially planar base support, said upstanding rear support member, and said forward extending top support member.

3. The document holder of claim 1 wherein said upstanding rear support member includes at least one opening formed within said rear support member, said opening comprising means for extending a keyboard cable through said opening.

4. The document holder of claim 1 wherein said forward extending top support member has a forward incline of approximately 0 to 20 degrees.

5. The document holder of claim 1 wherein said upstanding rear inclined support member has a rear incline of approximately 50 to 75 degrees.

6. The document holder of claim 1 wherein said forward extending support member at the front of the upstanding rear inclined support member has a forward incline of approximately 30 to 65 degrees.

7. A document holder adapted for use with a keyboard, a keyboard drawer and a keyboard cabinet at a computer workstation comprising:

a substantially planar base plate support, said substantially planar base plate support having a top surface, a bottom surface, a front edge, a rear edge, a right side edge and a left side edge, said substantially planar base plate adapted to be disposed beneath a keyboard;

an upstanding rear support member extending upwardly at the rear of said substantially planar base plate support, said upstanding rear support member adapted to be disposed behind a keyboard;

a forward extending top support member in front of said upstanding rear support member and integral to said upstanding rear support member, said forward extending top support member adapted to be disposed above a keyboard;

an upstanding rear inclined support member at the front of said forward extending top support member, said upstanding rear inclined support member adapted to be disposed above a keyboard;

a forward extending support member at the front of said upstanding rear inclined support member, said forward extending support member adapted to be disposed above a keyboard;

a removable copy support plate having a top surface, a bottom surface, and a bottom edge, wherein, in use, said bottom surface of said copy support plate rests against the front surface of the upstanding rear inclined support member, and wherein, in use, said bottom edge of said copy support plate rests against the top surface of the forward extending support member, said removable copy support plate, in use, adapted to be disposed above a keyboard; said removable copy support plate adapted to be disposed inside a keyboard drawer when not in use;

a projection member comprising means for preventing the bottom edge of said copy support plate from moving forward, wherein said bottom edge of said copy support plate is positioned to the rear of said projection member, and wherein said projection member projects from the top rear surface of said forward extending support member;

wherein said substantially planar base plate support, said upstanding rear support member, said forward extending top support member, said upstanding rear inclined support member, said forward extending support member, and said projection member are adapted to be disposed in a keyboard drawer; and wherein said substantially planar base plate support, said upstanding rear support member, said forward extending top support member, said upstanding rear inclined support member, said forward extending support member, said removable copy support plate, and said projection member are adapted to be disposed within a computer keyboard cabinet when not in use.

8. The document holder of claim 7 wherein said upstanding rear inclined support member and said forward extending support member are integral to each other, and wherein said upstanding rear inclined support member and said forward extending support member are integral to said substantially planar base support, said upstanding rear support member, and said forward extending top support member.

9. The document holder of claim 7 wherein said rear support member includes at least one opening formed within said rear support member, said opening comprising means for extending a keyboard cable through said opening.

10. The document holder of claim 7 wherein said forward extending top support member has a forward incline of approximately 0 to 20 degrees.

11. The document holder of claim 7 wherein said upstanding rear inclined support member has a rear incline of approximately 50 to 75 degrees.

12. The document holder of claim 7 wherein said forward extending support member at the front of the upstanding rear inclined support member has a forward incline of approximately 30 to 65 degrees.

* * * * *